(12) United States Patent
Fulton et al.

(10) Patent No.: US 6,928,379 B2
(45) Date of Patent: Aug. 9, 2005

(54) APPARATUS AND METHOD FOR SENSING TEMPERATURE

(75) Inventors: Steven J. Fulton, Elgin, IL (US); Edward A. Nelson, North Aurora, IL (US); Gregory A. Peterson, South Barrington, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/601,762

(22) Filed: Jun. 23, 2003

(65) Prior Publication Data

US 2004/0059538 A1 Mar. 25, 2004

Related U.S. Application Data

(60) Provisional application No. 60/390,511, filed on Jun. 21, 2002.

(51) Int. Cl.[7] ................... G01K 11/00; G01L 19/04; A21B 1/02
(52) U.S. Cl. ................... 702/130; 73/708; 219/398; 374/173
(58) Field of Search ................... 702/99, 103, 127, 702/130; 219/396, 448.17, 506, 627, 497, 501; 73/204.23, 708; 374/173, 149; 318/641

(56) References Cited

U.S. PATENT DOCUMENTS

| 4,106,341 | A | * | 8/1978 | Serrano | 374/173 |
|---|---|---|---|---|---|
| 5,285,053 | A | | 2/1994 | Fowler | 219/506 |
| 5,477,032 | A | | 12/1995 | Fowler et al. | 219/501 |
| 5,534,678 | A | * | 7/1996 | Bowles et al. | 219/396 |
| 5,618,460 | A | | 4/1997 | Fowler et al. | 219/497 |
| 5,668,320 | A | * | 9/1997 | Cowan | 73/708 |

* cited by examiner

*Primary Examiner*—Bryan Bui
*Assistant Examiner*—John Le
(74) *Attorney, Agent, or Firm*—Locke Liddell & Sapp LLP

(57) ABSTRACT

An apparatus and method for measuring the temperature in an oven includes a circuit and software algorithm that reads the voltage across a standard resistive temperature device (RTD) or thermistor to determine temperature measured by the device. Using an unregulated high voltage supply to increase the gain and resolution, it overcomes the problems of small changes in resistance with respect to temperature. An additional input to measure the unregulated supply voltage is used as a reference voltage input. The apparatus includes resistor dividers for both the temperature sensor and reference voltages, a microprocessor having analog inputs, and additional components for noise suppression and open sensor protection.

5 Claims, 2 Drawing Sheets

APPARATUS AND METHOD FOR SENSING TEMPERATURE

CROSS REFERENCE TO RELATED APPLICATIONS

This application claims priority to U.S. Provisional Application Ser. No. 60/390,511 filed Jun. 21, 2002, having the same title and inventors as identified herein, which is incorporated by reference herein in its entirety.

FIELD OF THE INVENTION

The invention relates to temperature measurement in appliances. Specifically, the invention involves an apparatus and method for high precision temperature measurement.

BACKGROUND OF THE INVENTION

A conventional household oven allows a user to set a temperature for baking or cooking food. The oven heats an oven chamber to the desired temperature and attempts to maintain that temperature in the oven chamber for the duration of the cooking period. To heat the oven and maintain the oven temperature, the conventional household oven includes heating elements, a temperature sensor, and a controller. For the oven's basic operation, the heating elements are supplied with power to heat the oven chamber. The temperature sensor senses the temperature within the oven chamber and supplies a temperature measurement signal to the controller indicative of the temperature. Based on the temperature measurement signal, the controller compares the measured signal with the desired temperature/setpoint and sends a control signal to a heater drive. The heater drive is operatively connected to the heating elements, and is capable of varying the power to the heating elements to maintain the desired temperature setpoint within the oven chamber.

Typically temperature measurement using an RTD is done utilizing a regulated voltage supply along with amplifiers, and comparators that increase the gain of the voltage measured across the RTD. These measurements are usually performed using the low regulated power sources as the voltage supply. Regulation of the voltage as well as amplification of the circuit significantly increases the amount of materials required for the temperature measurement, the cost of the component, and the space required for the measurement device. Moreover, to compensate for inaccuracy based on the circuits' calibration values, the offset determined at calibration is typically added to the measured temperature value during operation, which is less accurate than desired.

The present invention is directed to overcoming or at least reducing the effects of one or more of the problems set forth above.

SUMMARY OF THE INVENTION

The present invention relates to an apparatus for measuring the temperature in an appliance. The apparatus comprise a temperature transducer, the temperature transducer comprising a variable resistance that changes in response to the temperature. First and second resistors are coupled in series between a voltage supply and ground to form a first voltage divider. The junction of the first voltage divider is then coupled to an input of a microprocessor so as to provide the microprocessor with a signal indicative of the voltage across the first resistor. A third resistor coupled in series with the temperature transducer between the voltage supply and ground to form a second voltage divider. The junction of this voltage divider is coupled to another input of the microprocessor so as to provide a signal indicative of the voltage across the temperature transducer. The microprocessor then determines a temperature using the voltage across the temperature transducer and the second resistor to determine the resistance of the temperature transducer.

In another aspect, the apparatus may be constructed so that first and second resistors each comprise one or more individual resistors interconnected by one or more jumpers to provide suitable resistance values corresponding to the supply voltage. In still another aspect, the jumpers may also provides a signal to the microprocessor indicative of the supply voltage or resistance values selected. Alternatively, some other variable signal indicative of the supply voltage may be connected to the microprocessor.

In one aspect of the present invention, the microprocessor determines the temperature using a look-up table correlating the resistance of the temperature transducer to the temperature. In still another aspect, the temperature determined by the microprocessor is corrected by an offset value determined during a calibration routine and stored in memory of the microprocessor.

BRIEF DESCRIPTION OF THE DRAWINGS

Other objects and advantages of the invention will become apparent upon reading the following detailed description and upon reference to the drawings.

Figure 1:
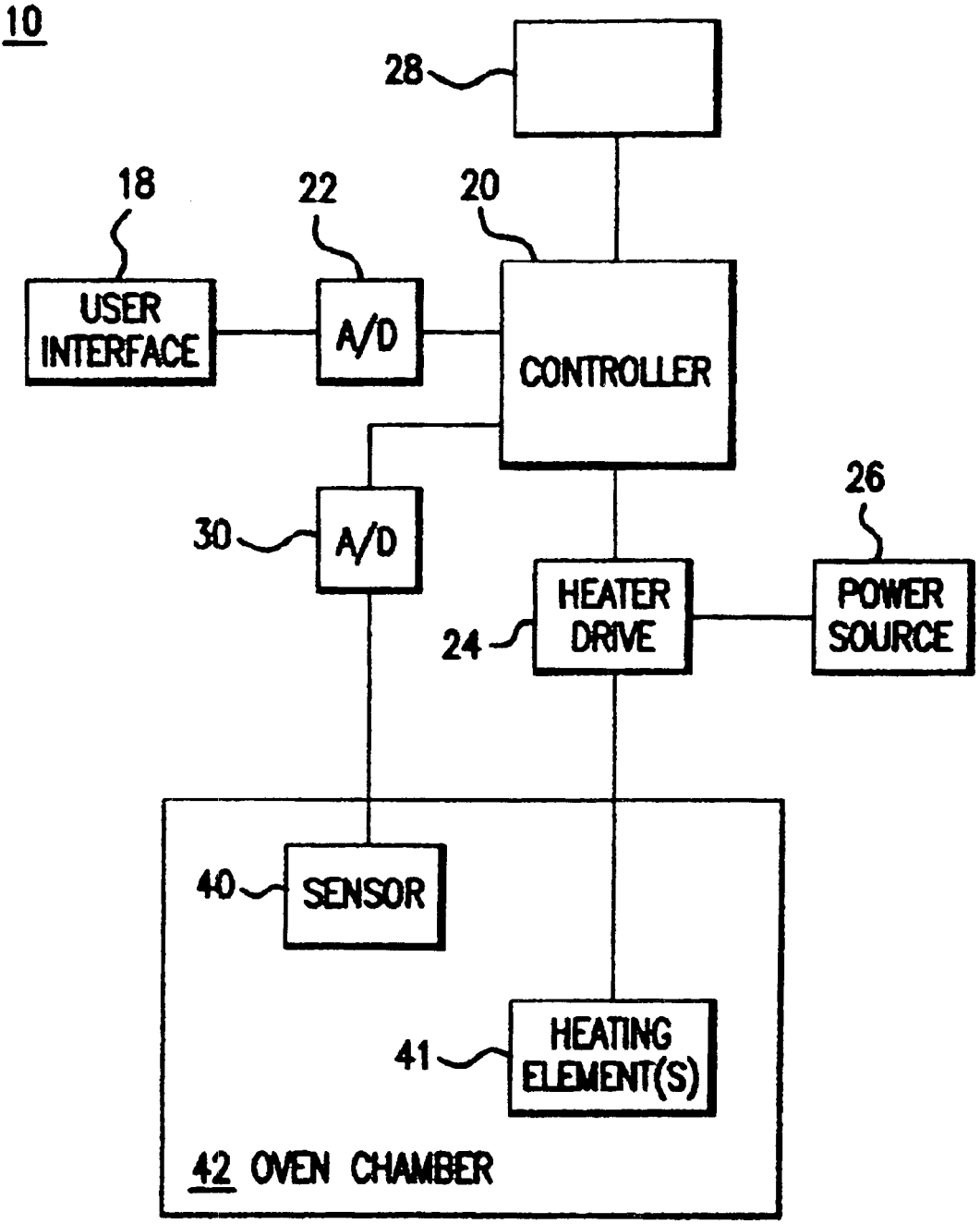
FIG. 1 is a block diagram of a typical household electric oven.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DETAILED DESCRIPTION

Although the following description is in terms of a control system for an oven, it will be understood by those skilled in the art that it is applicable to all types of appliances including all types of ovens, refrigerators, freezers, washers, dryers and dishwashers.

FIG. 1 is a block diagram of a household electric oven 10 according to one embodiment of the present invention. The oven comprises an oven chamber 42 having at least one heating element 41 and at least one temperature sensor 40. The oven 10 also has a user interface 18 that allows the user to control the operation of the oven 10. The user interface 18 is a typical interface on the front of a typical household oven. The interface 18 comprises a keypad with keys and/or dials that turn the oven on and off. Additionally, the keys and/or dials present on the user interface 18 instruct the oven to operate at particular temperature set point and operational mode. For example, the user selects the appropriate set point temperature for the oven chamber 42, such as 350° F., and selects the operating mode, such as bake mode and self-cleaning mode with the user interface 18.

The user interface 18 generates signals indicating pressed keys and/or dial positions. These signals are transmitted from the user interface 18 to a control unit 20 through an analog-to-digital converter 22. The analog-to-digital converter 22 receives the analog signals from the user interface 18 and transforms them into digital signals that are readable by the control unit 20. Although shown as separate elements, the analog-to-digital conversion can be done internally at the control unit 20 if it is the type of microcomputer or microprocessor equipped for such a purpose.

The control unit 20 receives and processes the signals from the user interface 18 through the analog-to-digital converter 22. The processing results in a series of control signals being sent from the control unit 20 to other elements of the oven to operate the oven at the desired oven temperature and in the desired oven mode. The control unit 20 sends control signals to a heater drive 24 that transmits power from a power source 26 to the heater elements 41. The control unit 20 may also send control signals to other elements of the oven, such as a fan, depending on the oven mode.

The control unit 20 also receives signals representing information stored in a memory 28. The memory 28 transmits its stored information signals over a data bus that is coupled to the control unit 20. In an alternative embodiment, the control unit 20 includes nonvolatile memory. The memory 28 stores information representing various heat settings in the oven's modes of operation. The control unit 20 requests the information stored in memory 28 based on the signal inputs received from the user interface 18. For example, if the user has selected the self-cleaning mode with the user interface 18, the control unit 20 obtains information from the memory 28 relating to the self-cleaning mode.

The control unit 20 also receives a signal representing an oven cavity temperature from the temperature sensor 40. The temperature sensor 40 is a standard resistive temperature device (RTD) sensor or any other temperature sensor known to those skilled in the art. The temperature signal is transmitted from the temperature sensor 40 to the control unit 20. In an alternative embodiment, the temperature signal from the temperature sensor 40 passes through an analog-to-digital converter (not shown). The analog-to-digital converter transforms the analog signals into digital signals for reading by the control unit 20 if the control unit 20 is only equipped to read digital signals.

The present invention relates to a circuit and algorithm for measuring the temperature of the oven chamber using the standard RTD temperature sensor.

Figure 2:
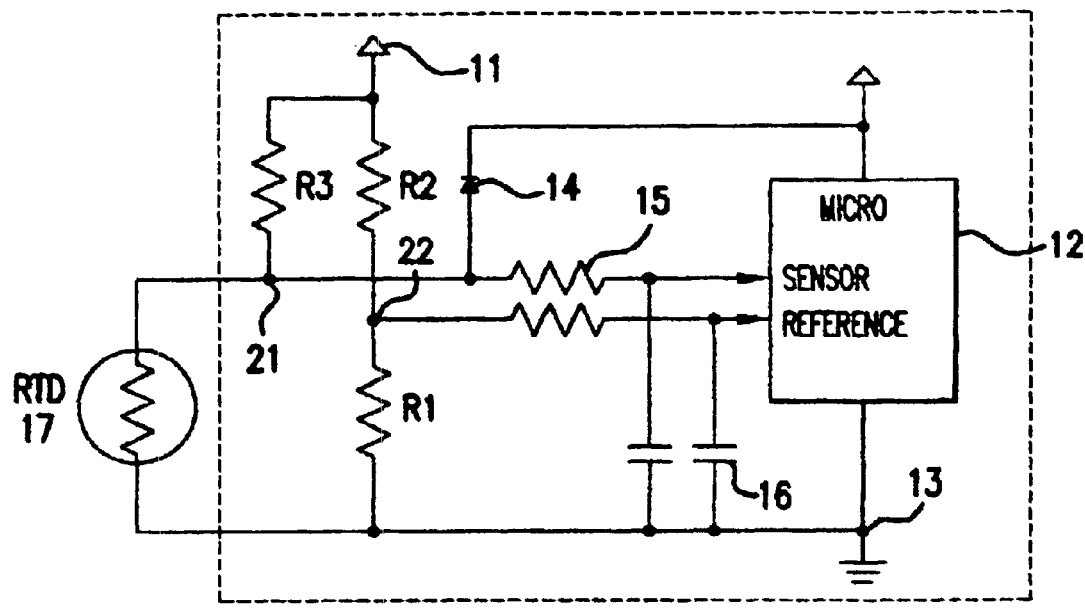
FIG. 2 is a circuit diagram illustrating an embodiment of the present invention.

FIG. 2 illustrates one embodiment of the temperature measuring circuit of the present invention. The circuit includes an unregulated power source 11, a microprocessor 12, resistive temperature device (RTD) 17, resistors R1, R2, R3, diode 14, RC filter circuits 15 and 16, and ground connection 13.

The unregulated power source is a high voltage DC supply that can have nominal values of 24V, 32V, or 40V DC. Because the voltage supply is unregulated the actual voltage supply can have a variety of ranges.

As is known in the art, the resistance of the RTD 17 varies in proportion to the temperature being measured by the RTD 17. As shown in FIG. 2, the resistor R3 and RTD 17 are series connected to form a voltage divider for the measuring the RTD 17 resistance. The voltage divider connection 21 measures the voltage across the RTD 17 and provides the value of the measurement to input 18 of microprocessor 12. The RC filter circuitry 15 filters any noise. Because the voltage supply is unregulated, to compensate for supply fluctuations, resistors R2 and R1 are connected in series to form a second voltage divider that represents the reference voltage. Voltage divider connection 22 has RC noise filter circuitry 16 and is connected to another input of the microprocessor. A diode 14 protects the microprocessor input 18 from over-voltage when the RTD 17 is disconnected.

Resistors R1 and R2 provide a signal below 5V DC for measuring the unregulated voltage supply. The values of resistors R1, R2, and R3 depend on the range of the unregulated supply for a given application, which in turn depends on the voltage requirements of any other devices connected within the circuitry. The microprocessor 12 as an analog-to-digital-converter (ADC) that converts the analog voltage readings into corresponding digital values.

It should be understood that any suitable values of supply voltage and component values can be used. However for illustrative purposes, the nominal values for a typical supply voltage have been used, as well as corresponding components. The microprocessor uses the voltage input 18 across the RTD 17 and the reference voltage input 19 across resistor R1 to compute the resistance of RTD 17. The microprocessor 12 then converts the resistance of the RTD 17 to a temperature value. Based on the measured voltage values across the RTD 17 and across the resistor R1 an equation is developed for a value for the resistance of the RTD 17, which eliminates the unregulated voltage supply value. As is known in the art, the resistance of the RTD 17 can be represented by equation 1 below:

$$R_{RTD} = \frac{R_1 \cdot R_2 \cdot V_{RTD}}{(R_1 + R_2) \cdot V_{REF} - R_1 \cdot V_{RTD}} \qquad \text{Equation 1}$$

where: $R_1$ is the resistance of resistor R1; $R_2$ is the resistance of resistor R2; $R_3$ is the resistance of resistor R3; $V_{RTD}$ is the measured voltage across RTD 17; and $V_{REF}$ is the measured voltage across resistor R1.

Typical nominal values of the unregulated high voltage DC power source are 24V, 32V, or 40V DC. Because the voltage supply is unregulated the actual voltage supply can have a variety of ranges for these nominal values, as indicated in table 1 below. Moreover, based on the nominal voltage values of the power source, resistor values for the resistors R1, R2, R3 have been chosen for illustrative purposes to maximize the analog input values and improve the resolution. These resistive values are also indicated in Table 1 below.

TABLE 1

| Nominal Voltage | Actual Voltage Range | R1 | R2 | R3 |
| --- | --- | --- | --- | --- |
| 24 V | 16–28 V | 41.2 kΩ ± 1% | 200 kΩ ± 1% | 14.0 kΩ ± 1% |
| 32 V | 22–38 V | 41.2 kΩ ± 1% | 287 kΩ ± 1% | 20.0 kΩ ± 1% |
| 40 V | 28–48 V | 41.2 kΩ ± 1% | 347 kΩ ± 1% | 26.1 kΩ ± 1% |

As shown in Table 1, based on these nominal voltage values 11, the resistance of R1 is a constant value of 41.2 kΩ. Because the typical nominal voltage can vary based on the appliance manufacturer's standards, in one embodiment of this invention, the circuit design includes three resistors for R2 having the computed resistive values for each nominal voltage value, and three resistors for R3 having the computed resistive values for each nominal value. In this embodiment, a jumper is installed on the printed circuit board of the device and is used to indicate the manufacturer's nominal voltage supply. The manufacturer places the jumper across the correct pins of the printed circuit board to indicate the corresponding nominal voltage. Also in this embodiment, placement of the jumper also sends an input to the microprocessor 12, triggering the corresponding resistors R1, R2, R3 value data stored within the memory of the microprocessor 12. In a alternative embodiment, rather than having a hardwired input signal sent to the microprocessor 12, based on the jumper position, the microprocessor 12 has a dial with multiple positions, indicative of the nominal voltage values. The dial is adjustable to allow the manufacture to select the desired nominal voltage value. Because the costs of the additional resistors and jumper components is minuscule, this design allows for lower manufacturing cost, by enabling the manufacture to produce one device that is end use configurable based on the end users requirements.

In one embodiment a data look-up table of degree Fahrenheit values an corresponding resistor values, shown in Table 2, is stored in the microprocessor's I read-only-memory (ROM). In this embodiment, based on Equation 1, the microprocessor 12 calculates the resistance of the RTD, and then using the stored ROM values indicated in Table 2, and interpolation, the microprocessor 12 calculates the temperature measured by the RTD 17.

TABLE 2

| ° F. | Ω |
| --- | --- |
| 0 | 932.060 |
| 10 | 953.340 |
| 20 | 974.572 |
| 30 | 995.766 |
| 40 | 1016.922 |
| 50 | 1038.042 |
| 60 | 1050.124 |
| 70 | 1080.169 |
| 80 | 1101.177 |
| 90 | 1122.148 |
| 100 | 1143.081 |
| 110 | 1163.978 |
| 120 | 1184.837 |
| 130 | 1205.659 |
| 140 | 1226.445 |
| 150 | 1247.192 |
| 160 | 1267.903 |
| 170 | 1288.577 |
| 180 | 1309.213 |
| 190 | 1329.812 |
| 200 | 1350.374 |
| 210 | 1370.899 |
| 220 | 1391.387 |
| 230 | 1411.838 |
| 240 | 1432.251 |
| 250 | 1452.628 |
| 260 | 1472.967 |
| 270 | 1493.269 |
| 280 | 1513.534 |
| 290 | 1533.762 |
| 300 | 1553.952 |
| 310 | 1574.106 |
| 320 | 1594.222 |
| 330 | 1614.301 |
| 340 | 1634.348 |
| 350 | 1654.343 |
| 360 | 1674.316 |
| 370 | 1694.246 |
| 380 | 1714.140 |
| 390 | 1733.996 |
| 400 | 1753.815 |
| 410 | 1773.597 |
| 420 | 1793.341 |
| 430 | 1813.049 |
| 440 | 1832.720 |
| 450 | 1852.353 |
| 460 | 1871.949 |
| 470 | 1891.508 |
| 480 | 1911.030 |

TABLE 2-continued

| ° F. | Ω |
| --- | --- |
| 490 | 1930.514 |
| 500 | 1949.962 |
| 510 | 1969.372 |
| 520 | 1988.746 |
| 530 | 2008.082 |
| 540 | 2027.381 |
| 550 | 2046.642 |
| 560 | 2065.867 |
| 570 | 2085.054 |
| 580 | 2104.205 |
| 590 | 2123.318 |
| 600 | 2142.392 |
| 610 | 2161.433 |
| 620 | 2180.435 |
| 630 | 2199.399 |
| 640 | 2218.326 |
| 650 | 2237.217 |
| 660 | 2256.070 |
| 670 | 2274.886 |
| 680 | 2293.665 |
| 690 | 2312.406 |
| 700 | 2331.111 |
| 710 | 2349.778 |
| 720 | 2368.408 |
| 730 | 2387.001 |
| 740 | 2405.557 |
| 750 | 2424.076 |
| 760 | 2442.557 |
| 770 | 2461.002 |
| 780 | 2479.409 |
| 790 | 2497.779 |
| 800 | 2516.112 |
| 810 | 2534.408 |
| 820 | 2552.666 |
| 830 | 2570.888 |
| 840 | 2589.072 |
| 850 | 2607.219 |
| 860 | 2625.330 |
| 870 | 2643.402 |
| 880 | 2661.438 |
| 890 | 2679.437 |
| 900 | 2697.398 |
| 910 | 2715.322 |
| 920 | 2733.210 |
| 930 | 2751.059 |
| 940 | 2768.872 |
| 950 | 2786.648 |
| 960 | 2804.386 |
| 970 | 2822.088 |
| 980 | 2839.752 |
| 990 | 2857.379 |

It is known to those skilled in the art that deviations in the circuit's components value compromise the accuracy of the RTD 17 temperature measurement and creates an offset in measured value. To compensate for this offset, calibration of the circuit is required. Calibration is performed by replacing the RTD 17 with a known resistance, representative of an ideal temperature. The microprocessor 12 is put in calibration mode and prompts the programmer to input the known resistance value. Based on the known resistance value, the microprocessor 12 chooses a temperature value corresponding to the known resistance, referred to as an ideal temperature. The microprocessor 12 then using Eq. 1 calculates the actual measured resistance and the corresponding temperature value. The microprocessor 12 then subtracts the measured temperature from the ideal temperature; the resulting value is the circuit's offset. This offset is stored in the ROM of the microprocessor 12.

In one embodiment of this invention, during normal operation of the circuit, the offset value is added to the measured temperature value, to provide a more accurate representation of the actual measured temperature. In a further aspect of this embodiment, for increased accuracy, the offset value is multiplied by the resistance of the ideal temperature used for calibration purposes and this value is then divided by the actual measured temperature, resulting in a percentage offset value. In this embodiment, rather than add the entire offset amount to the measured temperature value, the percentage offset value is added to the measured temperature value, providing a more accurate representation of the actual measured temperature.

In a further embodiment of this invention, efficiency in calculating the measured temperature and simplification of the software is achieved by manipulating Equation 1 to include a constant K and developing a value termed 'internal value', which can be used to determine the measured temperature. Equation 1 can be manipulated to include the constant K resulting in Equation 2:

$$\frac{(R_1 \cdot R_3)}{K \cdot R_{RTD}} = \frac{(R_1 + R_2) \cdot V_{REF} - R_1 \cdot V_{RTD}}{K \cdot V_{RTD}} \quad \text{Equation 2}$$

Equation 2 above represents the 'internal value' as well as Equation 7 below. The 'internal value' is inversely proportional to sensor resistance. In Equation 2, the voltage units cancel each other out. This allows the raw 10-bit analog input values to be used directly for $V_{REF}$ and $V_{RTD}$ without actually converting them to volts.

$$InternalValue = \frac{K_R \cdot V_{REF} - K_S \cdot V_{RTD}}{V_{RTD}} = \frac{R_1 \cdot R_3}{K \cdot R_{RTD}} \quad \text{Equation 7}$$

where: $K_R = (R_1 + R_2)/K$; $K_S = R_1/K$; and $K = (R_1 \cdot R_3)/(InternalValue \cdot R_{RTD})$.

Equation 3 represents the value of the constant K. Because the value of K depends upon the values of $R_1$ and $R_3$, a value for K has to be determined for each of the unregulated nominal voltage supply values. Because the internal value is inversely proportional to the resistance of the RTD, and the resistance of the RTD increases as the temperature increases, the value of 12288 decimal or 3000 hex is selected as the maximum to indicate a temperature of 0 deg F., which has an ideal resistance value of 963.63 Ω, based on Table 2. In binary form, this 3000 hex maximum value is much lower than the maximum 16-bit value. Based on this, the maximum 'internal value' can be determined using Equation 3.

$$K = \frac{(R_1 \cdot R_3)}{InternalValue \cdot R_{RTD}} \quad \text{Equation 3}$$

Using these values, a value for K at each nominal voltage value can be determined as shown in Table 3 below. Also values for $K_R$ and $K_S$ can be computed as shown above. Therefore using these equations, values for K, $K_R$ and $K_S$ are computed and shown in Table 3 below.

TABLE 3

| Nominal Voltage Supply | K | $K_R$ | $K_S$ |
|---|---|---|---|
| 24 V | 50.36119 | 4789 | 818 |
| 32 V | 74.94456 | 4562 | 573 |
| 40 V | 93.88765 | 4422 | 439 |

The values of K, $K_R$ and $K_S$ shown in Table 3 are programmed into the microprocessor's 12 ROM. Based on the circuit's nominal voltage supply 11, determinable by a jumper connection and/or a dial setting on the microprocessor 12, the microprocessor selects the correct values to calculate the RTD 17 temperature measurement.

Based on the 'internal values' for various resistance and equivalent temperature values, a look-up table, illustrated in Table 4, is generated and stored in the microprocessor's 12 ROM. Based on a 256 value decimal decrement being subtracted initially from the maximum 'internal value' 12288, and each iteration thereafter, Table 4 has 34 reference points termed i, that range consecutively from 0 to 33. Each i value corresponds to a specific 'internal value' and corresponding temperature value in degrees Fahrenheit, as illustrated in Table 4.

TABLE 4

ROM Table for Degrees Fahrenheit Conversion

| i | Internal Value | | Table |
|---|---|---|---|
| 0 | 3840 | 0F00 hex | 1056 |
| 1 | 4096 | 1000 hex | 955 |
| 2 | 4352 | 1100 hex | 864 |
| 3 | 4608 | 1200 hex | 783 |
| 4 | 4864 | 1300 hex | 713 |
| 5 | 5120 | 1400 hex | 650 |
| 6 | 5376 | 1500 hex | 594 |
| 7 | 5632 | 1600 hex | 543 |
| 8 | 5888 | 1700 hex | 498 |
| 9 | 6144 | 1800 hex | 456 |
| 10 | 6400 | 1900 hex | 418 |
| 11 | 6656 | 1A00 hex | 383 |
| 12 | 6912 | 1B00 hex | 351 |
| 13 | 7168 | 1C00 hex | 322 |
| 14 | 7424 | 1D00 hex | 294 |
| 15 | 7680 | 1E00 hex | 269 |
| 16 | 7936 | 1F00 hex | 245 |
| 17 | 8192 | 2000 hex | 223 |
| 18 | 8448 | 2100 hex | 203 |
| 19 | 8704 | 2200 hex | 183 |
| 20 | 8960 | 2300 hex | 165 |
| 21 | 9216 | 2400 hex | 148 |
| 22 | 9472 | 2500 hex | 132 |
| 23 | 9728 | 2600 hex | 116 |
| 24 | 9984 | 2700 hex | 102 |
| 25 | 10240 | 2800 hex | 88 |
| 26 | 10496 | 2900 hex | 75 |
| 27 | 10752 | 2A00 hex | 63 |
| 28 | 11008 | 2B00 hex | 51 |
| 29 | 11264 | 2C00 hex | 40 |
| 30 | 11520 | 2D00 hex | 29 |
| 31 | 11776 | 2E00 hex | 19 |
| 32 | 12032 | 2F00 hex | 9 |
| 33 | 12288 | 3000 hex | 0 |

An example of operation of the circuit is illustrated below, using the following values and referring to FIG. 2. As illustrated by this example, the RTD 17 actual temperature is 350° F.

Nominal Voltage Supply=32 V

Actual Voltage Supply=31 V $R_{RTD}$=1654.3

$V_{REF}$=3.852 V=788 after ADC $V_{RTF}$=2.379 V=487 after ADC

Using these values as well as the values for $K_R$ and $K_S$ shown in Table 3, the internal value is calculated using Equation 7 to be 6809 (rounded).

As shown in Table 4, the smallest 'internal value' is 3840, which represents the largest temperature value of 1056, indicated as Table$_1$. Hence calculation of i is computed as follows: i=(InternalValue=8340)/256 (truncated)=11. Once i has been calculated, the Degree Measurement (Deg.Meas.) is computed using the equation below, and referring back to Table 4. The microprocessor. 12 interpolates to determine the Deg. Meas. value.

$$Deg.Meas. = \frac{Table_i - (Table_i - Table_{i+1}) \cdot InternalValue - 3840 - 256 \cdot i}{256}$$

Using the above equation and the example above, the Deg.Meas. value is 364° F., whereas the actual temperature of the RTD 17 is 350° F. As previously mentioned, a further embodiment of this invention includes adjustment of the temperature for the offset determined by the initial calibration. In this embodiment of the invention, for increased accuracy, the calibration adjustment to the temperature measurement is proportional to the actual resistance measured. To further increase the accuracy, the calibration is performed at a resistance that corresponds to a relatively high temperature, so that the adjustment can be proportionally reduced for lower temperatures. The internal value is inversely proportional to the resistance, therefore the internal value is in the denominator of the calibration adjustment equation.

An example of the calibration, to determine to offset is illustrated below. In this example, the RTD 17 is replaced with a resistance that has a value of 2199.4 Ω that represents an ideal temperature of 630° F. During calibration the following is an example of the actual supply voltage and measured RTD 17 and reference voltages used:

Nominal Voltage Supply=32 V
Actual Voltage Supply=34V
$R_{RTD}$=2199.4
$V_{REF}$=4.224 V=864 after ADC
$V_{RTF}$=3.384 V=692 after ADC The internal value, i, and Deg. Meas. are calculated using the same method used for calculating the example actual operational measurement. Thus the following values are computed by the microprocessor 12:

Calibrated InternalValue=5123
Calibrated i=4
Calibrated Deg.Meas=649° F.

As indicated by the calibration, the offset of the circuit is −19° F., determined by subtracting the Cal. Deg. Meas. from the actual value (equivalent temperature value based on the resistance of the calibrating resistor).

Using the offset value of −19° F., the Compensated Deg. Meas. is more accurately determined using the Deg. Meas. of 364° F. computed earlier and the offset. Using the offset calculation, which compensates for the error determined at calibration, the Compensated Deg. Meas. of 349° F. is much closer to the Actual Deg. Meas. of 350° F.

Figure 3:
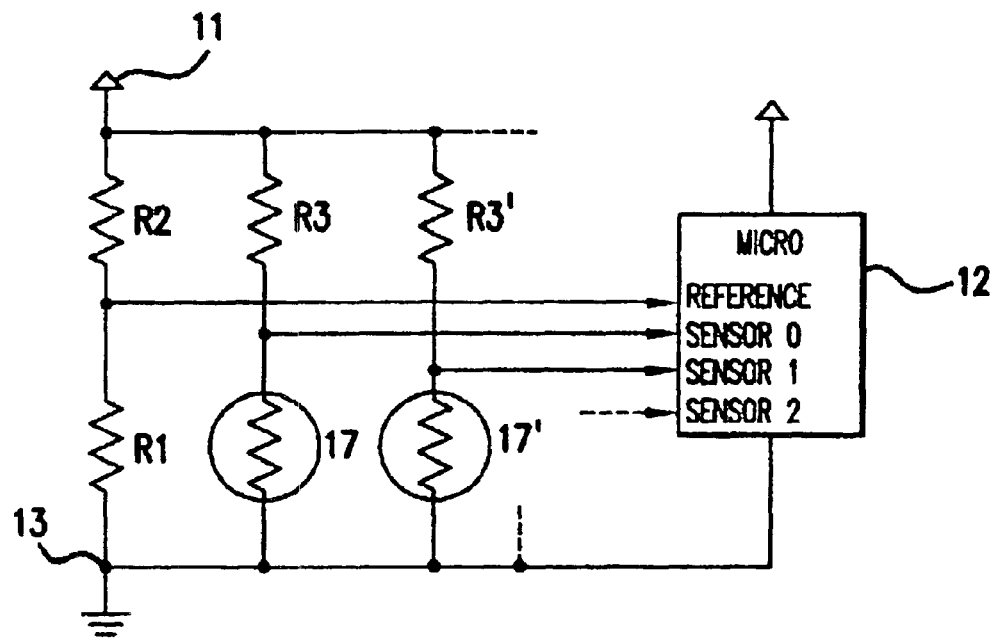
FIG. 3 is a circuit diagram illustrating an alternative embodiment of the present invention.

Although the embodiments have discussed the use of only one RTD 17, in a further embodiment of the present invention, multiple RTDs 17, 17' are used along with multiple series resistors R3, R3', as illustrated in FIG. 3

The foregoing description of preferred and other embodiments is not intended to limit or restrict the scope or applicability of the inventive concepts conceived of by the Applicants or defined in the appended claims. In exchange for disclosing the inventive concepts contained herein, the Applicants desire all patent rights afforded by the appended claims. It is intended that the inventive concepts defined by the appended claims include all modifications and alterations to the full extent that such modifications or alterations come within the scope of the appended claims or the equivalents thereof.

What is claimed is:

1. An apparatus for measuring the temperature in an appliance, the apparatus comprising:

a voltage supply; a temperature transducer comprising variable resistance that changes in response to the temperature;

first and second resistors coupled in series between the voltage supply and ground to form a first voltage divider, the junction of the first voltage divider being coupled to an input of a microprocessor so as to provide a signal indicative of the voltage across the first resistor, wherein the first and second resistors each comprise one or more individual resistors interconnected by one or more jumpers to provide suitable resistance values corresponding to the supply voltage; and a third resistor coupled in series with the temperature transducer between the voltage supply and ground to form a second voltage divider, the junction of the second voltage divider being coupled to an input of the microprocessor so as to provide a signal indicative of the voltage across the temperature transducer;

wherein the microprocessor determines a temperature using the voltage across the temperature transducer and the second resistor to determine the resistance of the temperature transducer.

2. The apparatus of claim 1 wherein the jumper also provides a signal to the microprocessor indicative of the supply voltage or resistance values selected.

3. The apparatus of claim 1 wherein a variable signal indicative of the supply voltage is connected to the microprocessor.

4. An apparatus for measuring the temperature in an appliance, the apparatus comprising:

a voltage supply; a temperature transducer comprising a variable resistance that changes in response to the temperature;

first and second resistors coupled in series between the voltage supply and ground to form a first voltage divider, the junction of the first voltage divider being coupled to an input of a microprocessor so as to provide a signal indicative of the voltage across the first resistor; and a third resistor coupled in series with the temperature transducer between the voltage supply and ground to form a second voltage divider, the junction of the second voltage divider being coupled to an input of the microprocessor so as to provide a signal indicative of the voltage across the temperature transducer;

wherein the microprocessor determines a temperature using the voltage across the temperature transducer and the second resistor to determine the resistance of the temperature transducer; and wherein the microprocessor determines the temperature using a look-up table correlating the resistance of the temperature transducer to the temperature.

5. The apparatus of claim 4 wherein the temperature is corrected by an offset value determined during a calibration routine and stored in memory.

* * * * *